T. B. CARROLL.
Rolling-Pins.

No. 154,582. Patented Sept. 1, 1874.

WITNESSES
Mary J. Utley.
Geo. E. Upham.

INVENTOR
Thomas B. Carroll
By Chipman Hosmer & Co
ATTORNEYS.

UNITED STATES PATENT OFFICE.

THOMAS B. CARROLL, OF INDIANAPOLIS, INDIANA.

IMPROVEMENT IN ROLLING-PINS.

Specification forming part of Letters Patent No. 154,582, dated September 1, 1874; application filed February 28, 1874.

*To all whom it may concern:*

Be it known that I, THOMAS B. CARROLL, of Indianapolis, in the county of Marion and State of Indiana, have invented a new and valuable Improvement in Rolling-Pins; and I do hereby declare that the following is a full, clear, and exact description of the construction and operation of the same, reference being had to the annexed drawings making a part of this specification, and to the letters and figures of reference marked thereon.

Figure 1:
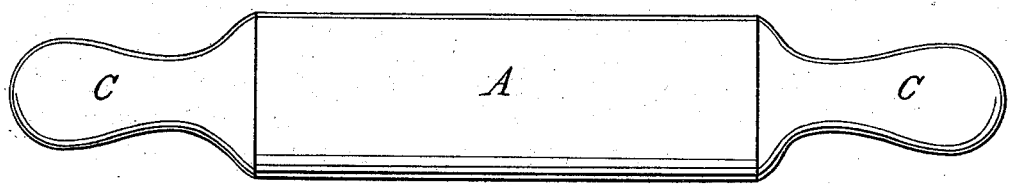
Figure 2:
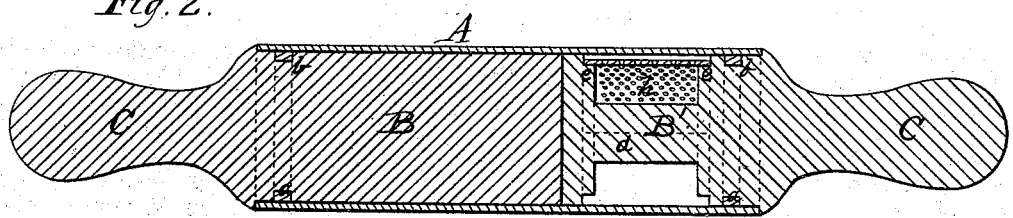
Figure 3:
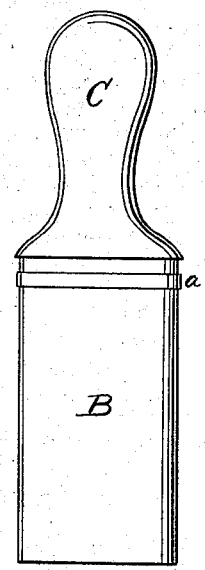
Figure 4:
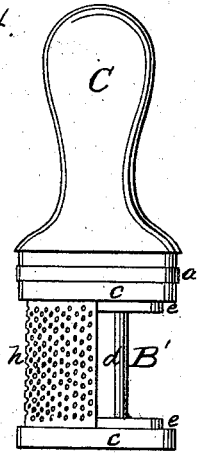

Figure 1 of the drawing is a representation of a side elevation of my rolling-pin. Fig. 2 is a sectional view of the same. Figs. 3 and 4 are detail views.

This invention has relation to rolling-pins; and it consists in the construction and novel arrangement of the handles and rolling-cylinder, whereby these parts may be used separately for other kitchen purposes, as hereinafter more fully described.

In the accompanying drawings, the letter A designates the cylinder, which is a plain tube of suitable diameter to serve for rolling purposes, the circular ends forming convenient biscuit-cutters, for use after the dough has been rolled. B B' indicate the journal-blocks, having the handles C C, and serving, when introduced into the ends of the cylinder, to form the journals upon which it rotates when the handles are grasped and moved by the operator. In order to keep the handles in place on the cylinder, annular packings $a$ or rings of rubber are located in grooves $b$ around the blocks B B', near the handles, and fitting against the interior wall of the cylinder, prevent longitudinal movement, a sort of air-tight chamber being formed between the packings in the tube.

A handle being provided for the block B, it may be made a little longer than the block B', and will serve an excellent purpose for mashing potatoes, beating steak, or performing other similar offices necessary in the preparation of food.

The block B' may also be utilized as a nutmeg-grater by simply turning out the exterior portion of the center in such a manner as to leave the end bearings $e$ and a central connecting-core, $d$, or stem.

Annular rabbets $e$, being turned in the inner edges of the bearings $c$, serve for the attachment of the cylindrical metallic grater $h$, in such a manner that it is set back from the interior wall of the rolling-cylinder.

What I claim as new, and desire to secure by Letters Patent, is—

The combination of the biscuit-cutter A, potato-masher B, and nutmeg-grater B', constructed and arranged to form a rolling-pin, in the manner substantially as specified.

In testimony that I claim the above I have hereunto subscribed my name in the presence of two witnesses.

THOMAS B. CARROLL.

Witnesses:
 A. PHIPS,
 FRANK M. SHORT.